United States Patent [19]

Fahy et al.

[11] Patent Number: 5,477,519
[45] Date of Patent: Dec. 19, 1995

[54] DATA STORAGE USING PULSED OPTICAL DOMAIN REVERSAL

[75] Inventors: Stephen B. Fahy, Cork, Ireland; Roberto Merlin, Ann Arbor, Mich.

[73] Assignee: The Board of Regents of the University of Michigan, Ann Arbor, Mich.

[21] Appl. No.: 255,269

[22] Filed: Jun. 7, 1994

[51] Int. Cl.[6] ................................. G11B 7/00; G02F 1/03
[52] U.S. Cl. .................... 369/100; 369/110; 359/251; 359/262; 422/82.01
[58] Field of Search ..................... 369/100, 110; 372/26, 27; 422/82.01, 82.02; 435/291; 436/501, 527; 250/330, 338.2; 356/3, 4; 359/245, 246, 251, 262

[56] References Cited

U.S. PATENT DOCUMENTS

| | | | |
|---|---|---|---|
| 4,636,799 | 1/1987 | Kubick | 359/251 |
| 4,765,721 | 8/1988 | Agostinelli et al. | 359/251 |
| 4,856,094 | 8/1989 | Heidrich et al. | 359/251 |
| 5,085,503 | 2/1992 | Osugi et al. | 359/251 |
| 5,091,980 | 2/1992 | Ogawa et al. | 359/262 |
| 5,156,810 | 10/1992 | Ribi | 422/82.01 |
| 5,157,539 | 10/1992 | Beasley | 359/251 |
| 5,193,023 | 3/1993 | Yamada et al. | 359/251 |

Primary Examiner—Loha Ben
Attorney, Agent, or Firm—Rohm & Monsanto

[57] ABSTRACT

Digital data is stored using optical means exclusively in a storage media which is characterized with a soft-phonon mode. Electric dipole domains in the storage medium are caused to reverse in polarity in response to the impinging thereon of an optical pulse. The optical pulse, which may be formed of a plurality of colliding optical pulses, must have sufficient energy to cause the reversal of the polarization of the electric dipole domain, or the reorientation thereof, without providing sufficient energy whereby the dipole reverts to its initial condition. Any material which exhibits structural phase transitions associated with soft-phonons which can couple directly or by non-linear processes to incident irradiation are candidates for optical domain-switching.

13 Claims, 2 Drawing Sheets

DATA STORAGE USING PULSED OPTICAL DOMAIN REVERSAL

BACKGROUND OF THE INVENTION

1. Field of the Invention

This invention relates to data storage systems, and more particularly, to a system wherein optical pulses are used to effect reversal of the optical domains of a material which exhibits structural phase transition, the data being written and read optically.

2. Description of the Related Art

The reading and writing of digital information on a media generally has employed ferromagnetic media wherein the direction of magnetization of small magnetic domains encodes digital information. Similarly, in ferroelectric and other media, the direction of microscopic dipole domains can be used to encode digital information. In the case of optically-read magnetic storage media, the direction of magnetization effects the reflection of a polarized laser light beam, whereby the encoded digital information can be read. There is, however, no currently available mechanism for repeatedly writing on these media whereby the information may be written and rewritten at will employing light only.

A currently available method for writing optically on a magnetic storage media (read/write optical dish) requires a small spot of the medium to be heated with an optical pulse. These known devices rely in their operation on the realization that coercive strength (i.e., the ease with which the magnetic dipoles in the material align to an external magnetic field) is a function of temperature. The optical disk is operated in a magnetic field, and when a spot of the medium is heated, a magnetic dipole of the disk aligns itself along the applied field. When the material is subsequently cooled, the magnetic dipole is fixed in its direction and will not realign to the field. In this manner, the direction of magnetization (and the data bit stored) at that point on the storage medium is fixed until another pulse is applied to heat that spot of the material. Thus, the rate at which the information can be written on such a medium is restricted by the rate at which the heat generated in the medium during the writing process can be conducted away.

It is, therefore, an object of this invention to provide a system wherein digital data can be stored and read using optical means exclusively.

It is another object of this invention to provide a system wherein digital data can be stored and read without requiring the application of an external magnetic field.

It is also an object of this invention to provide a system wherein digital data can be stored and read repeatedly using optical means exclusively.

It is a further object of this invention to provide a system wherein digital data can be stored and read repeatedly without requiring preheating of the storage location.

It is additionally an object of this invention to provide a fully optical switching arrangement which performs at very high speeds.

It is yet a further object of this invention to provide an optical data storage system wherein the operating speed is not limited by the cooling rate of the storage medium.

It is also another object of this invention to provide a data storage system wherein the reading and writing of data is performed exclusively optically with a very short switching time and with direct coupling to a fast optical interconnection or transmission line.

It is yet an additional object of this invention to provide a fully optical data write/read system which is relatively inexpensive to produce.

It is still another object of this invention to provide a fully optical data write/read system which does not require nanofabrication techniques to be employed during manufacturing.

It is a yet further object of this invention to provide a fully optical data write/read system which is nonvolatile and does not depend upon the application of a continuous electrical power to retain the data.

It is also a further object of this invention to provide a fully optical data write/read system which employs storage media materials which can be produced using developed technologies.

SUMMARY OF THE INVENTION

The foregoing an other objects are achieved by this invention which provides a method of storing data using fully optical means. In accordance with the invention, the following steps are included:

receiving the data to be stored;

converting the data into at least one optical pulse; and directing the optical pulse to impinge upon a medium formed at least partially of a storage material having a phonon mode characteristic associated with microscopic electric dipole domains, whereby the optical pulse causes the electric polarization of at least one microscopic electric dipole domain to reverse its polarity.

In various embodiments of the invention, a number of materials can be employed as the storage medium, for example, and without limitation, the medium can be formed of any of $LaAlO_3$, $LiTaO_3$, $KTaO_3$, $KNbO_3$. SbSi, and $BaTiO_3$. Solid solutions of these materials can be employed in the practice of the invention. More generally, the material may be a ferroelectric material or an anti-ferromagnetic material. Any material which exhibits structural phase transitions associated with soft-phonons which can couple directly or by non-linear processes to incident irradiation are candidates for optical domain-switching. In addition, the optical pulse is not limited to a single pulse, but may be formed from a plurality of colliding pulses.

In accordance with a further method aspect of the invention, the inventive method includes the following steps:

receiving the data to be stored;

converting the data into at least one optical pulse; and directing the optical pulse to impinge upon a medium formed at least partially of a nonferroelectric storage material having a soft phonon mode characteristic associated with microscopic electric dipole domains, whereby the optical pulse causes the electric polarization of at least one microscopic electric dipole domain to become reoriented.

In a specific embodiment of either method aspect of the invention, the storage material is characterized with a predeterminable vibration period of atoms, and the optical pulse is configured to have a duration which is less than the predeterminable vibration period.

BRIEF DESCRIPTION OF THE DRAWING

Comprehension of the invention is facilitated by reading the following detailed description, in conjunction with the annexed drawing, in which.

DETAILED DESCRIPTION

The inventors herein have analyzed the large-amplitude response of a soft-phonon material to impulsive light scattering, using a finite-temperature, classical model of phonon dynamics. For large amplitude light pulses, the domain structure is not destroyed, but undergoes coherent switching behavior where entire domains have their orientation reversed, without fragmentation. This coherent domain reversal occurs for values of the light amplitude which lie without broad windows, giving the effect a robustness which suggests that the behavior is not dependent on the precise details of the model used in the simulation presented here, but occurs generally in soft-phonon materials below the structural phase transition temperature. The switching of domain orientation occurs within a few phonon periods, which is typically of the order of 10 ps, raising the possibility of using the effect in fast optical switches. The effect can persist even when the energy per atom required for domain reversal is less than 1% of the average thermal energy per atom, indicating that the domain reversal can be achieved without substantial heating of the material. The physical process involved herein is therefore quite distinct from a heating-reannealing effect.

The simplest model containing the essential features of a phonon branch associated with a soft-mode transition is a set of harmonically coupled, damped oscillators (nearest-neighbor coupling spring constant=k, damping constant=$\gamma$, mass m=1, each in an anharmonic double-well potential $u(x)=x^4-ax^2$. (The barrier height between the wells is $a^2/4$, the minima occurring a $x=\pm\sqrt{a/2}$.

By taking a nearest-neighbor coupling only, for example, the important long-range coupling to the polarization field present in ferroelectrics is ignored. However, for present purposes, such a coupling does not affect the qualitative conclusions reached herein. The essential feature to be represented is the softening of the phonon branch near the center of the Brillouin zone. It will be assumed herein that the material under consideration is at a temperature below the structural phase transition temperature, where the soft-phonon mode of the high-temperature structure has acquired a permanent non-zero amplitude.

Figure 1:
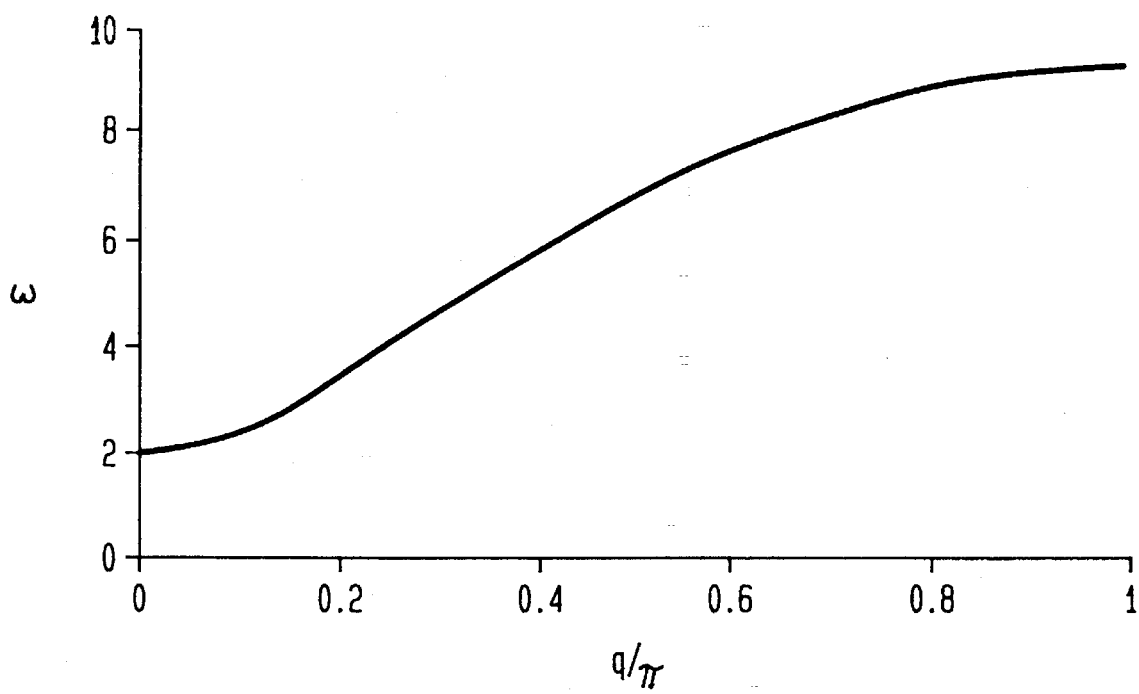
FIG. 1 is a graphical representation which illustrates phonon frequency ω plotted versus the wave vector q for the coupled anharmonic oscillators with nearest-neighbor coupling k=20 and double-well parameter a=1.

In the one-dimensional case of this model, the small-amplitude, harmonic oscillations about the well minima have a dispersion relation given by:

$$\omega^2=4a+2K[1-\cos q],$$

where q is the phonon wave vector, measured in units of the inverse atomic spacing. Thus, the phonon branch is substantially softened (i.e., has a frequency less than twice the lowest frequency $\omega_{min}=2\sqrt{a}$) over a fraction approximately $\sqrt{a/k}$ of the entire Brillouin zone, as long as the temperature is not too close to the transition temperature, so that it is reasonable for illustrative purposes to use a ration k/a=20 in simulations (see, FIG. 1). (It is to be noted that, even within the present model, the phonon frequencies are temperature-dependent, as a result of anharmonicity of the potential u(x)).

The fraction of the Brillouin zone over which softening occurs is closely related to the equilibrium thickness of a wall between domains of opposite orientation. Such domain walls have a thickness of order $\sqrt{k/a}$ unit cells. This point will be addressed again in the qualitative interpretation of the coherent domain reversal found in the numerical simulations.

To choose an appropriate value for the damping $\gamma$ to model the real system, it is noted that typically the soft phonons are strongly damped (as determined by the phonon line-width), such that a Q-factor of 10 of less is to be expected. For the zone-center mode in the present model, the Q-factor is $\sqrt{a}/\gamma$, suggesting that a value of $\gamma$ on the order of $\sqrt{a}/10$ or larger is appropriate. It will turn out that $\gamma$ plays a crucial role in determining the width of the windows of values for the pulse energy which give coherent domain reversal, larger values of $\gamma$ giving wider energy windows.

In order to examine numerically the collective dynamics of the system, an inventor herein has performed finite-temperature simulations on large arrays of oscillators (approximately $10^4-10^5$) with nearest-neighbor coupling. The equation of motion for the system is:

$$\bar{v}_i=-4x_i^3+2ax_i+k\Sigma(x_j-x_i)-\gamma v_i+\eta, \quad (1)$$

where $v_i=\dot{x}_i$, j varies over nearest neighbors of i, and $\eta$ is a random force term (proportional to $\gamma k_BT$) satisfying the fluctuation-dissipation theorem for temperature T. The damping and random force terms represent the anharmonic coupling of the modes in the phonon branch under consideration with all the electronic and vibrational degrees of freedom of the crystal not explicitly contained in the model.

An initial thermalization of the system is achieved at a specified temperature by evolving the system under thermal forces after starting with all atoms at the positive minimum $(x_i=\sqrt{a/2})$ of the double-well potential. Note that the thermalization time, though sufficient for relaxation of the positions within one domain, is not long enough to allow substantial domain wall creation or annihilation at low temperature, so that it is necessary to set up the initial condition of the system with a definite polarization.

Having reached thermalization of the positions and velocities of the particles, the effect of the optical pulse is reproduced by adding an impulse V to the velocity of each particle, i.e., $v_i \rightarrow v_i-V$. For a large system, this increases the average kinetic energy per particle by $V^2/2$. As will be shown below, this increment to the average energy per particle may be large or small compared to the average thermal energy, but it is important to note that the impulse contributes initially only to the motion in the zone-center vibrational mode.

Figure 2:
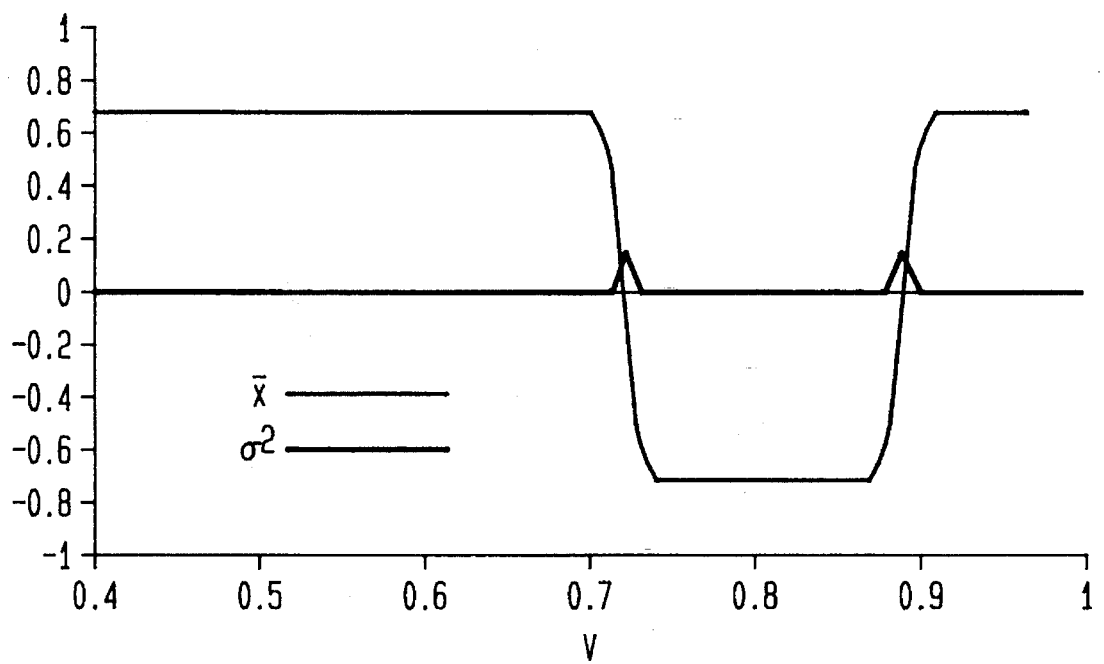
FIG. 2 is a graphical representation which illustrates the final average polarization $\bar{x}$ and variance $\sigma^2$ of position versus initial pulse velocity V for a system of 200×200 oscillators evolving according to $\bar{v}_i=-4x_i^3+2ax_i+k\Sigma(x_j-x_i)-\gamma v_i+\eta$, where $\gamma=0.1$, k=20, a=1; and $k_BT=0.25$.

FIG. 2 is a graphical depiction of the final average polarization (i.e., the average value of $x_i$) of a two-dimensional system of 200×200 oscillators, having evolved according to the equations of motion for a time $5/\gamma$ after an initial pulse V for various values V. The temperature $k_BT=0.25$ is equal to the barrier height for the single-particle potential u(x), which is approximately a factor of 20 smaller than the paraelectric transition temperature found in simulation of the system. (Note that a time of $5/\gamma$, which is of the order of 10 ps for many materials of interest, is long enough for the initial pulse of energy to be damped, though not necessarily long enough for annealing of any domain walls formed.) Also shown in FIG. 2 is the variance of the final positions. A large variance indicates the presence of multiple domains in the system at the end of the evolution time.

The original domain is not permanently altered until the pulse energy $V^2/2$ approximately equals the barrier height in u(x). Very close to this value of V, there is seen a sudden increase in the variance of the final positions of the atoms, indicating that fragmentation of the initial single-domain structure has occurred. This fragmentation is permanent on the time-scale of the present simulation. However, as the pulse velocity V is increased slightly, the fragmentation decreases again and the entire single-domain remains intact but undergoes a reversal of direction. Over a window of values between V=0.74 and 0.88, essentially no fragmentation occurs at all. At a higher threshold near V=0.89, fragmentation again occurs before the final domain orientation returns to its initial value for a range of values of V above 90.

Figure 3:
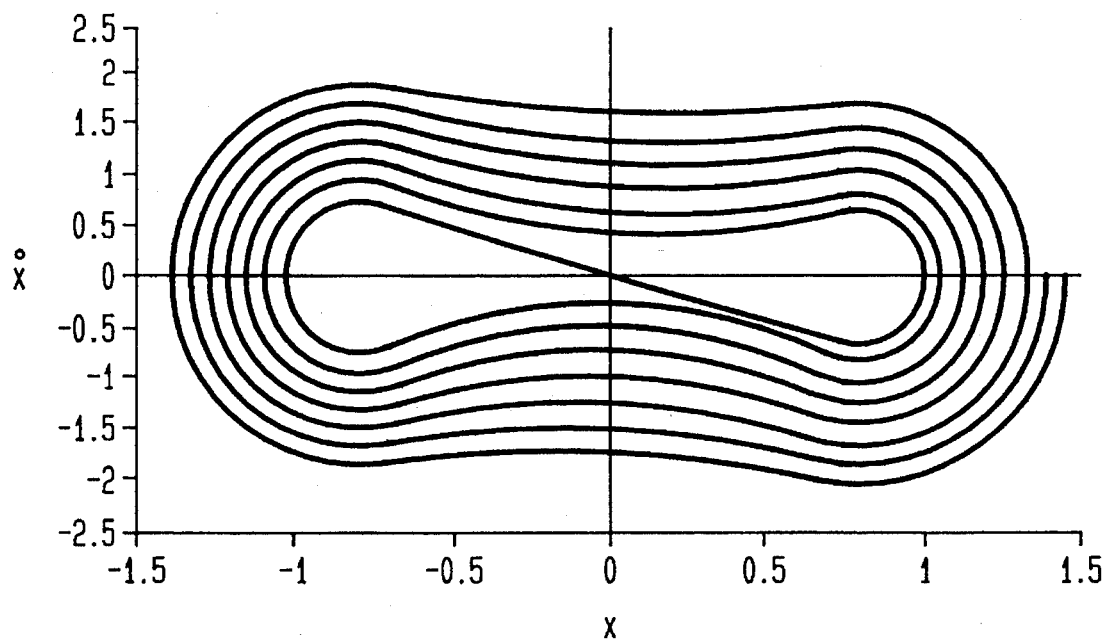
FIG. 3 is a phase-space $(x,\dot{x})$ representation for a single-particle situation in an anharmonic potential $u(x)=x^2-x^4$ with damping $\gamma=0.1$, showing the trajectories separating regions of initial conditions which lead to opposite final polarization $x=\pm\sqrt{2}$.

To understand this behavior, first consider a system at zero temperature. Since an identical velocity pulse is given to each particle, the entire system merely follows the dynamics of a single particle in the potential u(x), with the damping $\gamma$. In this situation, the final state of the particle is either at $\sqrt{a/2}$ or at $-\sqrt{a/2}$. Which value it finally takes depends on how many times the particle can climb over the barrier in u(x) before damping reduces its energy below the barrier height. If it can pass the barrier an odd number of times, it has a final value of $-\sqrt{a/2}$. Otherwise, it has a final value of $\sqrt{a/2}$ the width of the first energy window above the first threshold is equal to the energy lost due to damping during one half-period of the motion, i.e., the energy lost to damping in moving from x=0, $\dot{x}>0$ back to x=0, $\dot{x}<0$ (see, FIG. 3). For small damping $\gamma$, the motion is approximately periodic and the first energy window above threshold has a width $\Delta E = \gamma 2a\sqrt{2a}/3$. This width is proportional to the damping $\gamma$, so that a broader phonon line-width gives a broader energy window.

This pattern of windows of values of V giving intact domains for alternating orientation, separated by narrow thresholds where substantial domain fragmentation occurs persists as the temperature is increased. A particularly notable aspect of the behavior shown in FIG. 2 is the fact that the energy threshold over which fragmentation occurs is much smaller than the temperature of the system. Thus, although the temperature equals the barrier height and the thermal kinetic energy of each particle is comparable to the energy barrier in u(x), with an associated fluctuation in its velocity, this does not give rise to a comparable uncertainty in the value of V entering into the .single-particle∞ analysis of barrier passage given above.

This behavior can be understood when it is realized that the coupling of neighboring atoms prevents an individual atom from changing its displacement too much from that of its neighbors. Thus, it is not possible to form a long-lived domain fragment less than a certain critical size. One would expect the linear dimension of this critical domain fragment to be proportional to the thickness of a static domain-wall. (Certainly, the critical fragment must have a size at least twice the domain-wall thickness.) In the present model, this means that the critical domain fragment size is expected to be proportional to $\sqrt{k/a}$ and the number of atoms in this fragment to be proportional to $(k/a)^{d/2}$, where d is the dimension of the system.

This facilitates a qualitative analysis of the fragmentation and the average final polarization near the threshold, as follows: If it is assumed that there is a typical domain fragment size $N_D$ which acts as an independent entity, i.e., for which the coupling to the rest of the system can essentially be ignored, the velocity of the center of mass of this unit has a gaussian fluctuation $\Delta V$ with a standard deviation equal to $$\sqrt{k_B T/N_D}$$

where $k_B$ is Boltzmann's constant. This entity is treated as in a single-atom problem (ignoring its coupling to other parts of the system), but with the temperature reduced by a factor of $N_D$. We assume that if the initial (center of mass) velocity of this unit (the impulse velocity V plus the random thermal velocity $\Delta V$) is greater than a threshold value $V_t$, the final polarization of the unit will be negative. It is then straight-forward to show that a large system will have a final average polarization near threshold, $$\bar{x}(V) = x_0 \text{erf} \frac{V_t - V}{\sqrt{k_B T/N_D}} \quad (2)$$

where $x_0$ is the full polarization value. Equation (2) gives an excellent fit to the simulation results near threshold. This yields a value $N_D = 12\sqrt{k/a}$ for one-dimensional systems and $N_D + (30\sqrt{k/a})^2$ for two-dimensional systems. Three-dimensional systems of appropriate size require much larger computations yielding much larger values of $N_D$ in three-dimensional systems, with correspondingly sharper thresholds.

Figure 4:
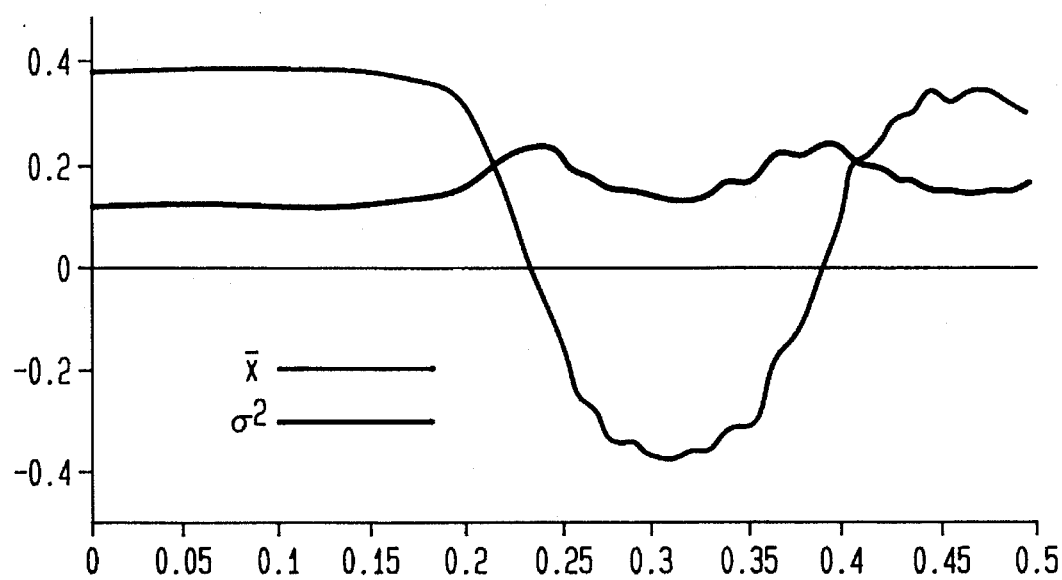
FIG. 4 is a graphical representation which illustrates the final average polarization $\bar{x}$ and variance $\sigma^2$ of position versus initial pulse velocity V, as in FIG. 2, but for a 400×400 system with a temperature $k_BT=4.5$.

FIG. 4 illustrates the average final polarization versus impulse velocity V for a temperature $k_B T=4.5$, comparable to the paraelectric transition temperature (which is slightly larger than 5 in the present simulations). A substantial renormalization of the barrier energy $V^2/2=0.03$ (a factor of 8 smaller than the low-temperature barrier) and of the domain polarization, is seen as expected. It is noteworthy that, although the average energy added per particle is less than 1% of the thermal energy, the domain reversal threshold remains quite sharp, and clear windows of alternating final polarization persist in FIG. 4. At this temperature, the width of the first energy window is comparable to the threshold energy $V^2/2$, so that a substantial fractional error can be tolerated in the applied pulse energy without seriously degrading the reliability of the domain reversal. Since the average energy per particle in the present simulation is only increased by about 1%, the heating effect of a single pulse is small. In a material with many phonon branches, this heat is distributed over all modes and the temperature rise in the material is correspondingly reduced.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A method of storing data, the method comprising the steps of:

receiving the data to be stored;

convening the data into at least one optical pulse; and directing the optical pulse to impinge upon a medium formed at least partially of a storage material having a phonon mode characteristic associated with microscopic electric dipole domains, whereby the optical pulse causes the electric polarization of at least one microscopic electric dipole domain to reverse its polarity.

2. The method of claim 1 wherein said storage material has a predeterminable vibration period of atoms, and said optical pulse has a duration which is less than the predeterminable vibration period of atoms.

3. The method of claim 1 wherein said storage material comprises $LaAlO_3$.

4. The method of claim 1 wherein said storage material comprises $LiTaO_3$.

5. The method of claim 1 wherein said storage material comprises $KTaO_3$.

6. The method of claim 1 wherein said storage material comprises $KNbO_3$.

7. The method of claim 1 wherein said storage material comprises SbSi.

8. The method of claim 1 wherein said storage material comprises $BaTiO_3$.

9. The method of claim 1 wherein said storage material comprises a solid solution of selectable ones of $LaAlO_3$, $LiTaO_3$, $KTaO_3$, $KNbO_3$, SbSi, and $BaTiO_3$.

10. The method of claim 1 wherein said storage material comprises a ferroelectric material.

11. The method of claim 1 wherein said storage material comprises an anti-ferroelectric material.

12. The method of claim 1 wherein said step of converting comprises the step of producing a plurality of colliding optical pulses.

13. A method of storing data, the method comprising the steps of:

receiving the data to be stored;

converting the data into at least one optical pulse; and directing the optical pulse to impinge upon a medium formed at least partially of a nonferroelectric storage material having a soft phonon mode characteristic associated with microscopic electric dipole domains, whereby the optical pulse causes the electric polarization of at least one microscopic electric dipole domain to become reoriented.

* * * * *